United States Patent [19]
Blaikie

[11] Patent Number: 5,879,123
[45] Date of Patent: Mar. 9, 1999

[54] VEHICULAR TRANSPORT ATTACHMENT

[76] Inventor: William Bruce Blaikie, P.O. Box 4610, Quesnel, B.C., Canada, V2J 3J8

[21] Appl. No.: 954,000

[22] Filed: Oct. 20, 1997

[51] Int. Cl.$^6$ ........................................................ B60P 1/44
[52] U.S. Cl. ............................. 414/537; 104/47; 414/462
[58] Field of Search .................................. 104/35, 45, 47;
414/537, 538, 477, 480, 467, 507, 501;
296/181, 182

[56] References Cited

U.S. PATENT DOCUMENTS

| | | |
|---|---|---|
| 2,593,215 | 4/1952 | Summerhays .............................. 104/47 |
| 3,536,214 | 10/1970 | Sorg et al. . |
| 3,757,972 | 9/1973 | Martin . |
| 4,109,809 | 8/1978 | Clark . |
| 5,259,720 | 11/1993 | Lobner . |
| 5,393,191 | 2/1995 | Alexander . |

*Primary Examiner*—Frank E. Werner
*Attorney, Agent, or Firm*—Robert H. Barrigar; Barrigar & Moss

[57] ABSTRACT

A vehicular transport apparatus for use with a carrier to transport other vehicles as cargo. The vehicular transport apparatus includes a support frame, a rotary mount on the support frame, a rotatable deck mounted on the rotary mount, a deck lock beside the rotatable deck that is pivotably attached to the carrier frame by a pin, a biassing means associated with the deck lock for biassing the deck lock into the lock position, and a ramp for loading the carried vehicle onto the rotatable deck, which can be secured to the rotatable deck or the support frame. The support frame is secured in a fixed position on the carrier by an attachment beam that mates with brackets attached to the carrier. Above the support frame, the rotatable deck can support the cargo of carried vehicles, and can rotate about an axis of rotation relative to the support frame and the carrier, such that the vehicles constituting the cargo can be both driven on and off the rotatable deck by rotating the rotatable deck and the cargo through 180 degrees. This rotation of the rotatable deck can be controlled by means of the deck lock that can move between a lock position and an open position. In the lock position, the deck lock is adjacent to and in engagement with the rotatable deck and beyond the rotatable deck from the axis of rotation, so that the deck lock impedes rotation of the rotatable deck by occupying space required by the rotatable deck in order for the rotatable deck to start rotating about the axis of rotation. In the open position, the deck lock is outside the path of travel occupied by the rotatable deck in turning about the axis of rotation.

13 Claims, 6 Drawing Sheets

VEHICULAR TRANSPORT ATTACHMENT

FIELD OF THE INVENTION

This invention relates in general to a carrier attachment for use in transporting vehicles such as snowmobiles, and more particularly to a vehicular transport attachment to be mounted in the bed of a pick-up truck.

BACKGROUND OF THE INVENTION

Snowmobiles and other vehicles are commonly transported when loaded onto a carrier, such as when loaded in the bed of a pick-up truck. Problems with this approach to snowmobile transport arise due to the weight of the snowmobile and the difficulty inherent in turning snowmobiles around in the limited space available in the truck bed. In order to drive a snowmobile both on and off a truck bed, the snowmobile must be rotated roughly 180° while in the truck bed, unless the snowmobile has a reverse gear, adding considerably to the weight and cost of the snowmobile. In practice, it is prohibitively difficult to turn a snowmobile around in a truck bed, and it is necessary to manually load or unload the snowmobile instead. Thus, if the snowmobile is driven onto the truck, then the snowmobile faces forward and must be manually unloaded. If the snowmobile is driven off the truck, then the snowmobile must have been facing backwards in the truck bed and must previously have been manually loaded. Consequently, the snowmobile must either be manually loaded or manually unloaded from the carrier, resulting in considerable inconvenience, loss of time, and the potential for injury that not unexpectedly arises from trying to move a five hundred pound machine. Such manual loading or unloading is particularly difficult in the case of a snowmobile due to the fact that the skis of the snowmobile are designed to slide forwards, and tend to steer sideways when pulled backwards.

Prior snowmobile transport apparatus has been devised to address the above noted problems. For example, U.S. Pat. No. 5,393,191 (Alexander) discloses a snowmobile-transporting device for mounting in a pick-up truck. The snowmobile-transporting device includes a snowmobile-carrying platform which supports the snowmobile. The snowmobile-carrying platform is pivotally mounted on a support frame so that the snowmobile can be rotated in the truck bed. In use, the support frame is mounted in the bed of a pick-up truck, and enables snowmobiles to be driven on and off the snowmobile transporting device on the pick-up truck.

A number of problems with the device disclosed by Alexander arise from the need to prevent unwanted rotation of the snowmobile-carrying platform and the snowmobile. It is particularly important to prevent such unwanted rotation when the pick-up truck is in motion, and when the snowmobile is being loaded or unloaded. Accordingly, the snowmobile-transporting device disclosed by Alexander provides a locking mechanism comprising brackets 43 and pins 46. In order to prevent movement of the snowmobile-carrying platform relative to the support frame, the pins are inserted into the back brackets. Unfortunately, due to the cold temperatures in which the snowmobile-carrying device is likely to be used, the pins are susceptible to becoming stuck in the brackets due to icing. Alternatively, the brackets into which the pins fit may ice over so that the pins cannot be inserted. The cold temperatures may also adversely affect the fine-motor coordination of the user of the snowmobile-carrying device, making it difficult for such user to remove and insert the pins, which may possibly be dropped and lost in the snow.

An optimal solution to the problem of what locking mechanism to use to prevent unwanted rotation of a rotatable deck on which a snowmobile is mounted, would include the following features:

(1) The mechanism should be easy to use in extremely cold temperatures, in that it should not require a great deal of fine-motor dexterity and thereby require users to remove their gloves or mitts.

(2) In order to minimize the number of parts required the mechanism should preferably serve some other useful purpose in addition to locking the rotatable deck against rotation.

(3) The locking mechanism should reliably prevent rotation of the rotatable deck.

(4) The locking mechanism should resist becoming stuck due to icing.

SUMMARY OF THE INVENTION

An object of one aspect of the present invention is to provide a vehicular transport attachment in which the rotatable deck can be locked against unwanted rotation simply, reliably, and without removing clothing such as gloves.

In accordance with one aspect of the present invention, there is provided a vehicular transport attachment for use with a carrier to transport cargo. The cargo would themselves be vehicles such as, for example, snowmobiles. The vehicular transport attachment includes a support frame, a rotary mount on the support frame, a rotatable deck mounted on the rotary mount, a deck lock beside the rotatable deck that is secured to the carrier frame by a movable mount, a biassing means associated with the deck lock for biassing the deck lock into the lock position, and a ramp for loading the carried vehicle onto the rotatable deck, which can be secured to the rotatable deck or the support frame.

The support frame includes a securing mechanism for securing the support frame in fixed position on the carrier. Above the support frame, the rotatable deck can support the cargo of carried vehicles, and can rotate about an axis of rotation relative to the support frame and the carrier. This rotation of the rotatable deck can be controlled by means of the deck lock that can move between a lock position and an open position. In the lock position, the deck lock is adjacent to and in engagement with the rotatable deck and beyond the rotatable deck from the axis of rotation, so that the deck lock impedes rotation of the rotatable deck by occupying space required by the rotatable deck in order for the rotatable deck to start rotating about the axis of rotation. In the open position, the deck lock is outside the path of travel occupied by the rotatable deck in turning about the axis of rotation. Preferably, the movable mount is a pivotal mount and the deck lock can be pivoted between the lock position and the open position.

The rotatable deck can be rotated 180° while the carried vehicles are on the rotatable deck. When the vehicular transport attachment is used, the carried vehicles are driven forward onto the rotatable deck via the ramp, rotated 180° prior to unloading, and driven forward off the rotatable deck via the ramp. Unwanted rotation of the rotatable deck and the carried vehicles is impeded by the deck lock being in the lock position when the carrier is in motion.

BRIEF DESCRIPTION OF THE DRAWINGS

A detailed description of the preferred embodiments are provided herein below with reference to the following drawings, in which.

Figure 1:
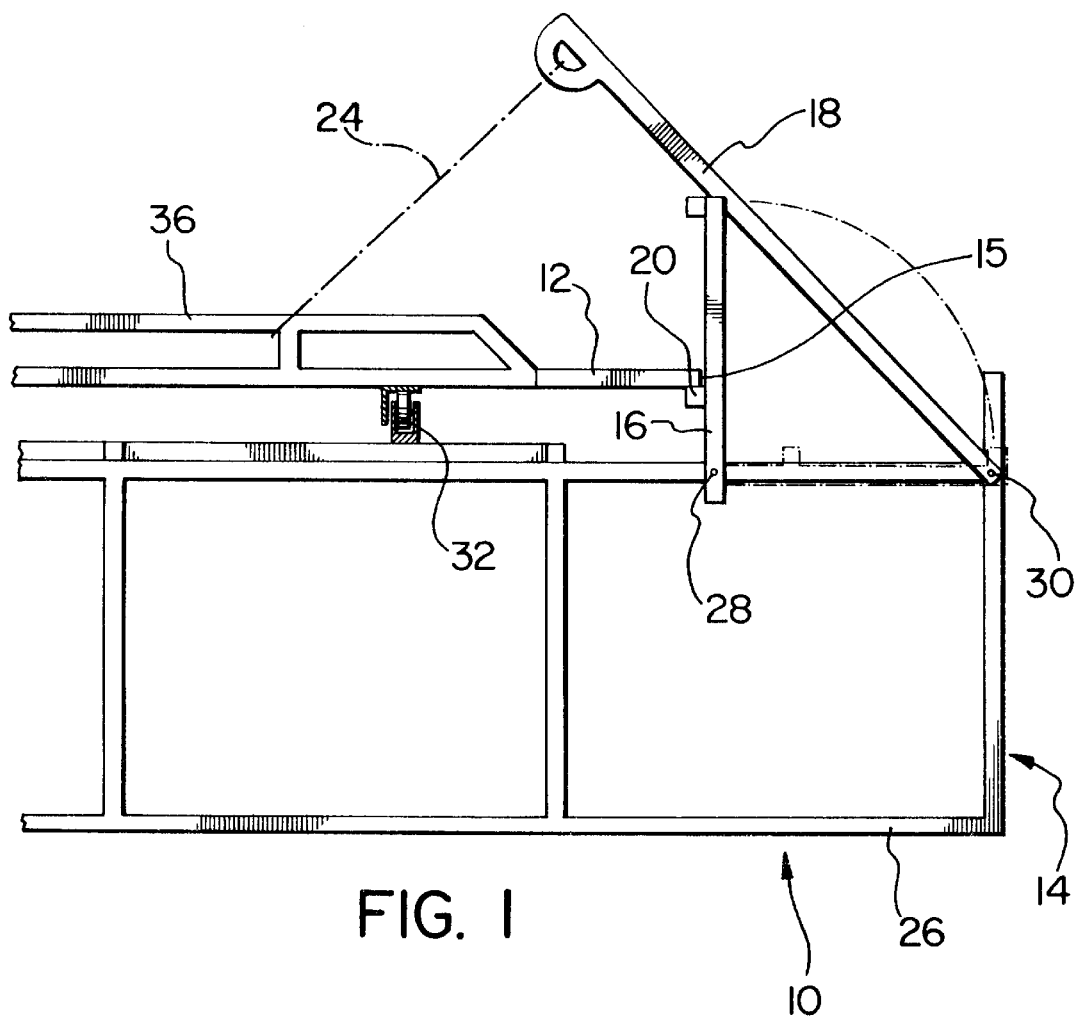
FIG. 1, in a sectional fragment view illustrates a portion of a vehicular transport attachment in accordance with the preferred embodiment of the invention.

In the drawings, the preferred embodiments of the inventions are illustrated by way of example. It is to be expressly understood that the description and drawings are only for the purpose of understanding, and not intended as a definition of the limits of the invention.

DETAILED DESCRIPTION OF THE INVENTION

Figure 7:
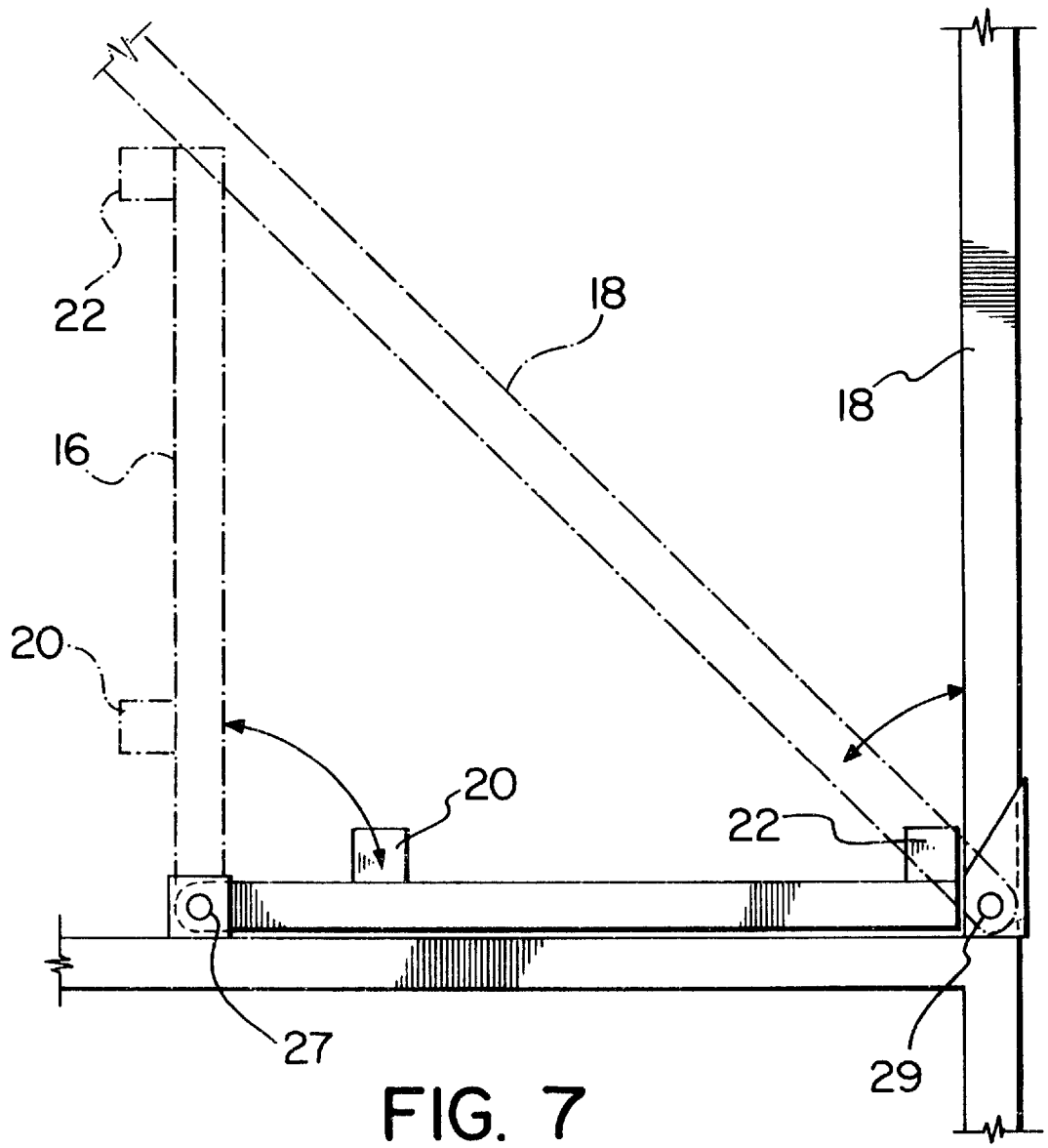

Referring to FIG. 1, there is illustrated in a sectional view, a vehicular transport attachment 10 in accordance with a preferred embodiment of the invention. The vehicular transport attachment 10 includes a rotatable deck 12 to support cargo such as a snowmobile or a pair of snowmobiles. The rotatable deck 12 rests on a rotary mount 11 on a support frame 14, such that the rotatable deck 12 can rotate about an axis of rotation 13 (shown in FIG. 2). The support frame 14 includes a securing mechanism in the form of attachment beam 26 for fixedly securing support frame 14 to the truck bed. In the embodiment shown, the attachment beam 26 is a floor beam 26 that fits under and engages mating brackets on the floor of the truck bed (not shown). The rotatable deck 12 also includes peripheral portions 15 that are distal from the axis of rotation 13. Preferably and as illustrated, peripheral portion 15 is straight-edged. In the embodiment illustrated, there are two opposed peripheral portions 15, which are on opposite sides of the rotatable deck 12 from each other such that when one of the two opposed peripheral portions 15 faces forward, the other of the two opposed peripheral portions 15 faces rearward. A deck lock 16 is mounted to the support frame 14 by a pivotal mounting at the forward end of the rotatable deck 12. The pivotal mounting can be implemented using any suitable components, such as a hinge, a pivot pin, or a pivot sleeve, and enables the deck lock 16 to pivot about a deck lock pivot axis 28. In the embodiment shown in FIG. 7, the pivotal mounting of the deck lock 16 is a deck lock pivot pin 27.

When in an open position, in which the deck lock 16 is swung away from portion 15 to lie horizontally below the rotatable deck 12, the deck lock 16 does not obstruct the peripheral portion 15 from turning about the axis of rotation 13. Thus, when the deck lock 16 is in an open position, the rotatable deck 12 is free to rotate about the axis of rotation 13. In FIG. 1, the open position of the deck lock 16 is indicated by a dashed line.

When the deck lock 16 is pivoted upwards about the deck lock pivot axis 28 towards the rotatable deck 12 to a lock position at the point where the deck lock 16 is substantially vertical, the deck lock 16 comes into contact with the peripheral portion 15. At that point, the deck lock 16 will impede rotation of the rotatable deck 12 by obstructing the peripheral portion 15 from turning about the axis of rotation 13. FIG. 1 illustrates the lock position of the deck lock 16.

When in the lock position or close to the lock position, the deck lock 16 is biassed into the lock position by biassing means such as springs or an auxiliary bulkhead described below, or by gravity tending to pull the deck lock into contact with the peripheral portion 15. The vehicular transport attachment 10 also includes a ramp 56 (shown in FIGS. 5 and 6). The ramp 56 may be secured to the rotatable deck 12, the support frame 14, or to the truck.

The deck lock 16 preferably includes a deck support beam 20. The deck support beam 20 fits under the forward end of the rotatable deck 12 when the deck lock 16 is in the upright or lock position (as illustrated in FIG. 1), thereby supporting the forward end of the rotatable deck 12.

Figure 6:
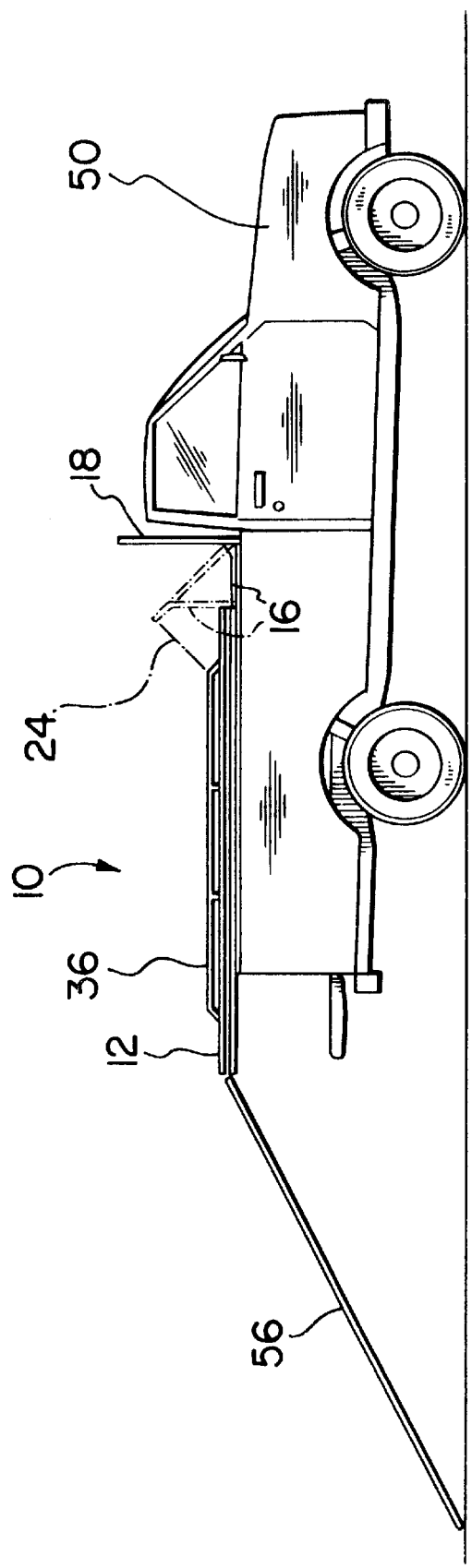
FIG. 6 is a side view of the vehicular transport attachment of FIG. 1 shown mounted on a truck with a ramp extending rearwardly therefrom; and, FIG. 7 is a sectional fragment view of the deck lock and auxiliary bulkhead of the vehicular transport attachment of FIG. 1.

Referring to FIG. 6, the deck lock 16 when in an upright or lock position forms a bulkhead 16, which provides a barrier between the cargo on the rotatable deck 12 and the cab of the truck 50. The lock position of the deck lock 16 is indicated by a dashed line in FIG. 6. In the illustrated embodiment, an optional auxiliary bulkhead 18 is pivotally attached to the support frame 14 by a hinge, pivot pin, pivot sleeve, or other suitable attachment at an auxiliary bulkhead pivot axis 30, which is between the deck lock pivot axis 28 and the cab of the truck. In the embodiment shown in FIG. 7, the pivotal mounting of the auxiliary bulkhead 18 is a auxiliary bulkhead pivot pin 29. The auxiliary bulkhead 18 can pivot about axis 30 between a hold position, indicated by a dashed line in FIG. 6, and a release position, indicated by a solid line in both FIG. 6 and FIG. 7. When in the release position, the auxiliary bulkhead 18 extends substantially vertically upwards from the auxiliary bulkhead pivot axis 30. In order to move the auxiliary bulkhead 18 to the hold position, the deck lock 16 must be in the lock position. Then the auxiliary bulkhead 18 is pivoted towards the rotatable deck 12 until the auxiliary bulkhead 18 rests against the forward side of the deck lock 16. This is the position illustrated in FIG. 1, and is also shown by the dashed line in FIG. 7. The auxiliary bulkhead 18 can then be secured in the hold position by running auxiliary bulkhead straps 24 from the support frame 14 to the auxiliary bulkhead 18. The deck lock 16 optionally includes an upper support beam 22 on which the auxiliary bulkhead 18 rests when the deck lock 16 is in the lock position and the auxiliary bulkhead 18 is in the hold position.

Figure 2:
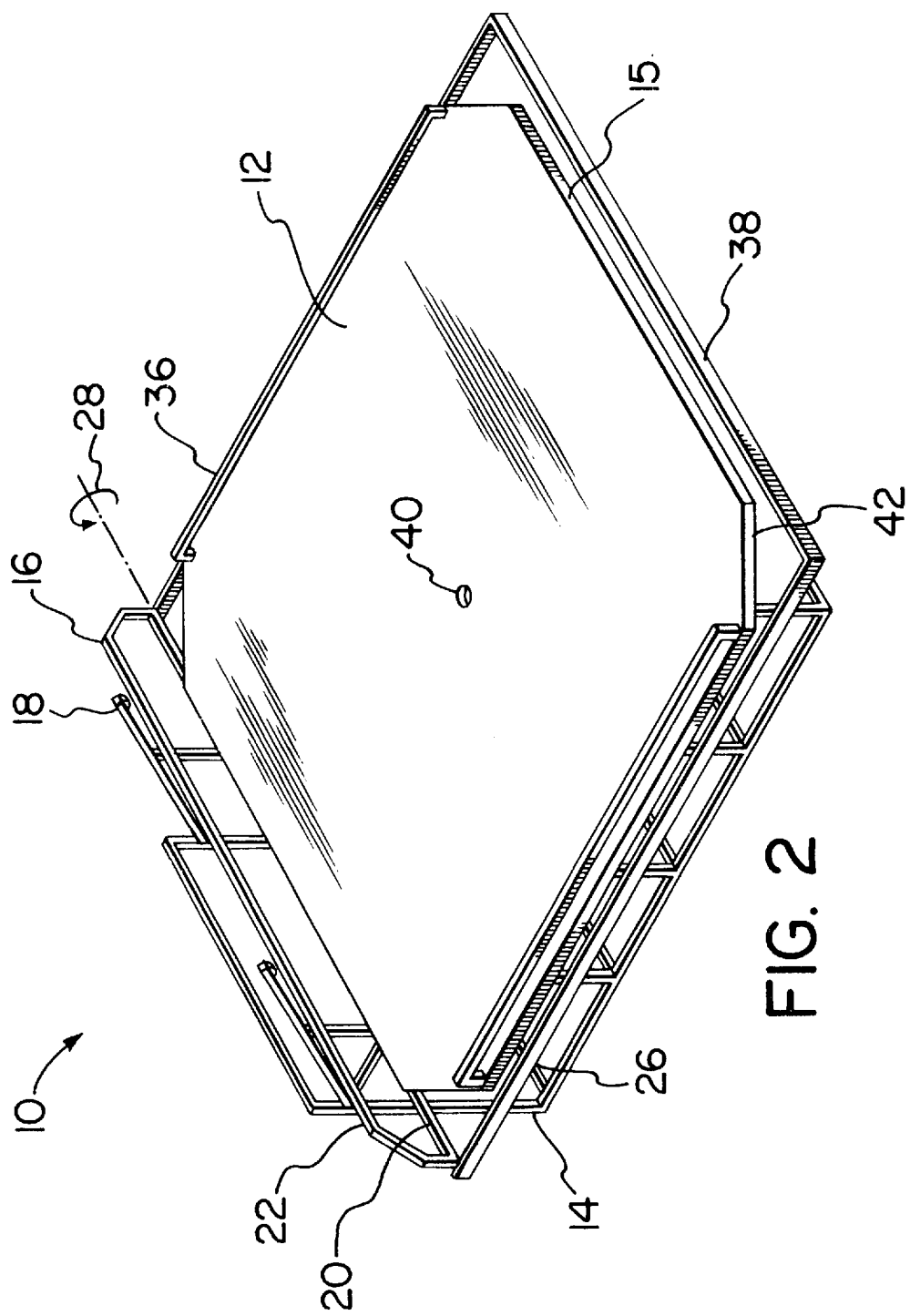
FIG. 2 is an isometric view of the vehicular transport attachment of FIG. 1.

FIG. 2, in a perspective view, illustrates the rotatable deck 12 as mounted on the support frame 14. The axis of rotation 13 extends upwards through the hub 40, and is substantially perpendicular to the rotatable deck 12. The deck lock 16 and the auxiliary bulkhead 18 are shown in their lock position and hold position respectively, where the auxiliary bulkhead 18 rests on the upper support beam 22 of the deck lock 16. The rotatable deck 12 also includes optional guard rails 36 to prevent the cargo from sliding off the sides of the rotatable deck 12. Preferably, the cargo should also be secured to the rotatable deck 12 by cargo straps (shown in FIG. 6) that can be fastened to the guard rails. Preferably, as illustrated, the corners 42 of the rotatable deck 12 are cut-away or bevelled, in order to facilitate rotation of the rotatable deck 12.

Figure 5:
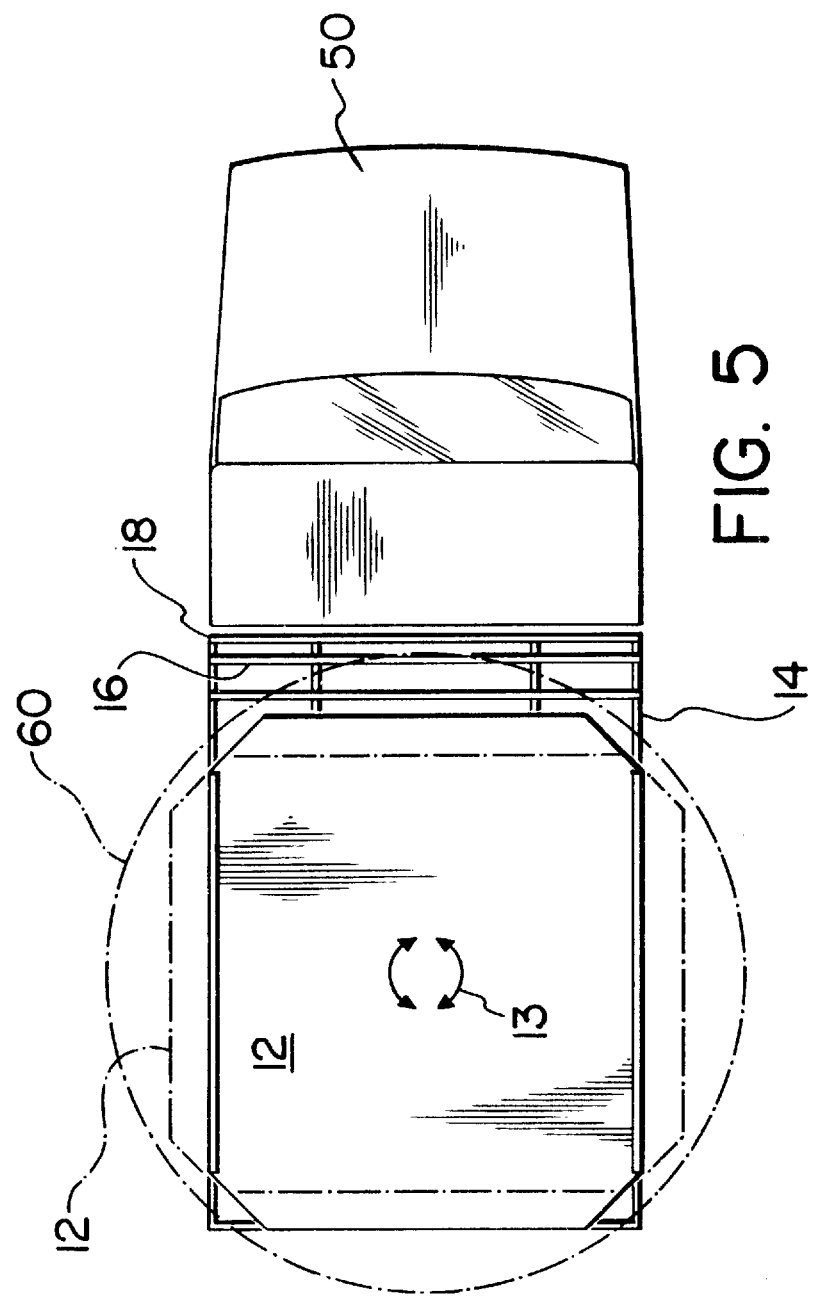
FIG. 5 is a plan view of the vehicular transport attachment of FIG. 1 shown mounted on a truck with a ramp extending rearwardly therefrom.

FIG. 5, in a plan view, illustrates the rotatable deck 12 and the support frame 14 as mounted in a bed of a truck 50. The position that the rotatable deck 12 occupies when rotation is impeded by the deck lock 16 is indicated by a solid line. The position of the rotatable deck 12 after rotating through 90 degrees from the solid line position is indicated by a dashed line. The circular dashed line 60 indicates the clearance the rotatable deck 12 requires in order to complete a revolution.

Figure 3:
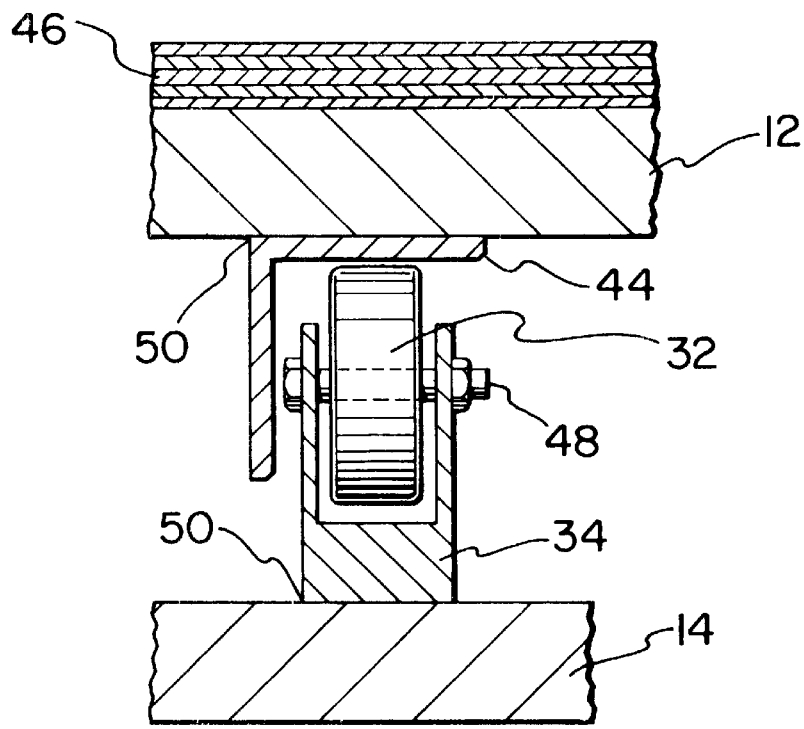
FIG. 3 is an enlarged sectional fragment view of the track and rollers of the rotary mount of the vehicular transport attachment of FIG. 1.
Figure 4:
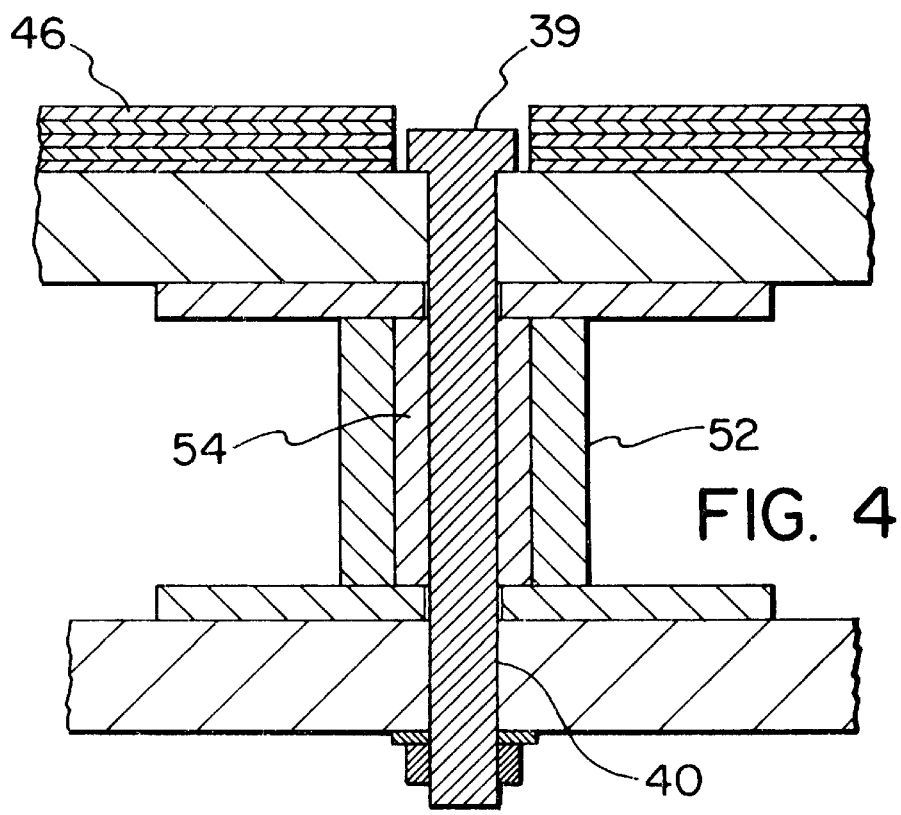
FIG. 4 is an enlarged sectional fragment view of the hub of the rotary mount of the vehicular transport attachment of FIG. 1.

FIGS. 3 and 4 illustrate the rotary mount 11 that permits the rotatable deck 12 to rotate relative to the support frame 14 about the axis of rotation 13. Referring to FIG. 3, there is illustrated a roller 32 and a roller mounting bracket 34. A plurality of such rollers 32 are mounted in a generally circular array spaced from the axis of rotation 13 on the upperside of the support frame 14. Each of the rollers 32 is mounted on a roller axle 48 aligned radially relative to axis 13 and held in place by bracket 34. A circular track 44 on the lower side of the rotatable deck 12 is spaced at the same radial distance as the rollers 32 from the axis of rotation, such that the peripheral edge of each of the rollers 32 that is currently uppermost contacts the track 44. The track 44 and bracket 34 are welded to the rotatable deck 12 and the support frame 14 respectively. Thus, the rollers 32 provide support to the rotatable deck 12 via the track 44, and permit the rotatable deck 12 to rotate about the axis of rotation 13 relative to the support frame 14.

Referring to FIG. 4, there is illustrated a hub 40 including a bushing 54 within a spacer 52. A main axle 39 extends through the hub 40. As shown in both FIGS. 3 and 4, the rotatable deck 12 preferably includes an uppermost surface deck layer 46, made from plywood, for example.

In operation, one or more snowmobiles or other cargo are loaded on the rotatable deck 12, in the case of snowmobiles, by driving them up the ramp onto the rotatable deck 12 so that the snowmobiles are facing forwards. The snowmobiles can then be secured to the rotatable deck 12 by means of cargo straps (not shown) attached to the guard rails 36. Preferably, the snowmobiles are secured by the cargo straps before the rotatable deck 12 is rotated and before the truck starts moving.

When the snowmobiles are being loaded onto the rotatable deck 12, the rotatable deck 12 is prevented from rotating about the axis of rotation by the deck lock 16, which is in the lock position and obstructs one of the two opposed peripheral portions 15 from turning about the axis of rotation 13 thereby preventing the rotatable deck 12 from rotating about the axis of rotation 13. The deck lock 16 is also in the lock position when the truck is moving. Preferably, the auxiliary bulkhead 30 is in the hold position while the truck is moving, in order to safeguard against the deck lock 16 slipping into the open position. Either before or after the truck is moved from the loading point to the unloading point, and when the snowmobiles are facing forward on the rotatable deck 12, the auxiliary bulkhead 30 is pivoted to the release position and the deck lock 16 is pivoted to the open position. This permits the formerly obstructed opposed peripheral portion 15 to turn, thereby permitting the rotatable deck 12 to rotate about the axis of rotation 13. The rotatable deck 12 is then rotated 180° such that the snowmobiles face rearwards. The rotatable deck 12 is then locked against rotary motion by the deck lock 16 being pivoted upwards into the lock position against the other of the two opposed peripheral portions 15. The snowmobiles may then be unloaded by running the snowmobiles down the ramp.

Variations of what has been described and illustrated in this specification will readily occur to those skilled in the technology. For example, instead of mounting the deck lock 16 so that it can be pivoted into the lock position about a deck lock pivot axis 28, the deck lock 16 could be (1) mounted in a sliding mount so as to slide into the lock position, or (2) mounted in an appropriately threaded mount so as to be unscrewed into the lock position. Additionally, instead of being at the forward end of the truck compartment, the deck lock 16 could be at the rearward end of the truck compartment and the ramp could be pivotally attached to the support frame 14 such that the ramp in its non-use position, rests against the deck lock 16. In this case, the ramp in its upright position would act as the auxiliary bulkhead 18. With respect to the axis of rotation 13 shown in FIG. 2, although the rotation direction is shown as clockwise, the rotatable deck could alternatively be mounted to rotate in a counter-clockwise direction, or in both a clockwise and counterclockwise direction. Accordingly, the invention is not to be limited by the specifics or embodiments above, the scope of the invention is as defined in the claims.

What is claimed is:

1. A vehicular transport attachment for use with a carrier for transporting cargo such as carried vehicles, said vehicular transport attachment comprising:

(a) a support frame for mounting onto the carrier, said support frame including a securing mechanism for securing said support frame in fixed position on said carrier;

(b) a rotary mount on said support frame;

(c) a rotatable deck mounted on said rotary mount such that said rotatable deck can
 (i) support the carried vehicles, and
 (ii) rotate about an axis of rotation relative to said support frame and the carrier, and
 (iii) be rotated 180° while the carried vehicles are on said rotatable deck;

(d) a deck lock beside said rotatable deck and secured to said carrier frame by a movable mount such that said deck lock can move between a lock position and an open position;

(e) a biassing means associated with said deck lock for biassing said deck lock into said lock position; and (f) a ramp for loading the carried vehicle onto the rotatable deck, said ramp being constrainable to at least one of said rotatable deck and said support frame;

wherein (g) when in said lock position, said deck lock
 (i) is adjacent to and in engagement with said rotatable deck and beyond said rotatable deck from said axis of rotation,
 (ii) is located forward of said rotatable deck and between said rotatable deck and the cab of the carrier,
 (iii) extends upwards from said support frame past said rotatable deck,
 (iv) provides a bulkhead between the carried vehicles and the cab of the carrier,
 (v) impedes rotation of said rotatable deck by occupying space required by said rotatable deck in order for said rotatable deck to start rotating about said axis of rotation; and (h) when in said open position, said deck lock
 (i) is outside the path of travel of said rotatable deck in turning about said axis of rotation; and, (i) the carried vehicles can be
 (i) driven forward onto said rotatable deck via said ramp,
 (ii) rotated 180° prior to unloading, and
 (iii) driven forward off said rotatable deck via said ramp; and (j) unwanted rotation of said rotatable deck and the carried vehicles is impeded by said deck lock being in said lock position when said carrier is in motion.

2. A vehicular transport attachment as defined in claim 1 wherein said movable mount is a pivotal mount, said deck lock being pivotable between said lock position and said open position.

3. A vehicular transport attachment as defined in claim 2 wherein said deck lock comprises a lower support beam, said lower support beam fitting under and supporting said rotatable deck when said rotatable deck is in said lock position.

4. A vehicular transport attachment as defined in claim 2 wherein said biasing means is an auxiliary bulkhead, said auxiliary bulkhead having a release position and a hold position, said release position and said hold position being defined such that (a) said deck lock is free to move between said open position and said lock position when said auxiliary bulkhead is in said release position;

(b) when said deck lock is in said lock position, said auxiliary bulkhead can be moved to said hold position by engaging said auxiliary bulkhead with said deck lock, said auxiliary bulkhead holding said deck lock in said lock position when said auxiliary bulkhead is in said hold position; and, (c) when said auxiliary bulkhead is in said hold position, said auxiliary bulkhead provides an additional barrier between the carried vehicles and the cab of the carrier.

5. A vehicular transport attachment as defined in claim 4 wherein (a) said auxiliary bulkhead is connected to said support frame by an auxiliary pivotal mounting located beyond said pivotal mounting from said rotatable deck;

(b) said auxiliary pivotal mounting permits said auxiliary bulkhead to rotate from said release position to said hold position, said auxiliary bulkhead (i) leaning towards said rotatable deck and against said deck lock when in said hold position, such that the force of gravity biases said auxiliary bulkhead in said hold position against said deck lock, and (ii) being spaced from said deck lock when said auxiliary bulkhead is in said release position, thereby permitting said deck lock to be moved from said lock position to said open position.

6. A vehicular transport attachment as defined in claim 5 wherein said auxiliary bulkhead can be secured in said hold position by straps securing said auxiliary bulkhead to said support frame.

7. A vehicular transport attachment as defined in claim 1 wherein (a) said rotatable deck has a first opposed peripheral portion distal from said axis of rotation and a second opposed peripheral portion distal from said axis of rotation and on an opposite side of said rotatable deck from said first opposed peripheral portion;

(b) said deck lock, when in said lock position, locks said rotatable deck (i) in a first position wherein position, said deck lock borders said first opposed peripheral portion beyond said rotatable deck from said axis of rotation, said deck lock impeding rotation of said rotatable deck by occupying space said first opposed peripheral portion must traverse in order for said rotatable deck to rotate about said axis of rotation, and (ii) in a second position wherein said deck lock borders said second opposed peripheral portion beyond said rotatable deck from said axis of rotation, said deck lock impeding rotation of said rotatable deck by occupying space said second opposed peripheral portion must traverse in order for said rotatable deck to rotate about said axis of rotation:

said rotatable deck in said first position being rotated by 180° from said rotatable deck in said second position;

(c) said deck lock, when in said open position, is outside space said first opposed peripheral portion and said second opposed peripheral portion must traverse in order for said rotatable deck to rotate about said axis of rotation;

whereby the carried vehicles can be (d) driven forward onto said rotatable deck via said ramp when said rotatable deck is locked in one of said first position and said second position;

(e) rotated 180° on said rotatable deck prior to unloading, said rotatable deck being locked in the other of said first position and said second position by said deck lock after said rotatable deck is rotated 180°; and (f) driven forward off said rotatable deck via said ramp when said rotatable deck is locked in the other of said first position and said second position.

8. A vehicular transport attachment as defined in claim 7 wherein (a) said peripheral portion is definable by a radial distribution measured from said axis of rotation, said radial distribution comprising a plurality of radial distances, each of said plurality of radial distances being the shortest distance from a unique point on said peripheral portion to said axis of rotation; and, (b) said peripheral portion being configured such that said plurality of radial distances vary in magnitude.

9. A vehicular transport attachment as defined in claim 8 wherein said peripheral portion is substantially planar and parallel to said axis of rotation.

10. A vehicular transport attachment as defined in claim 9 wherein said second opposed peripheral portion is substantially parallel to said first opposed peripheral portion.

11. A vehicular transport attachment as defined in claim 1 wherein (a) said rotatable deck can rotate in both a clockwise and a counterclockwise direction;

(b) said rotatable deck has a peripheral portion distal from said axis of rotation, said peripheral portion being configured relative to said rotatable deck and said deck lock such that (i) when in said lock position, said deck lock borders said peripheral portion beyond said rotatable deck from said axis of rotation, said deck lock impeding rotation of said rotatable deck by occupying space said peripheral portion must traverse in order for said rotatable deck to rotate about said axis of rotation, and (ii) when in said open position, said deck lock is outside space said peripheral portion must traverse in order for said rotatable deck to rotate about said axis of rotation:

(c) said peripheral portion comprises a counterclockwise locking surface and a clockwise locking surface, (i) said counterclockwise locking surface being obstructed by said deck lock from turning about said axis of rotation in said counterclockwise direction and (ii) said clockwise locking surface being obstructed by said deck lock from turning about said axis of rotation in said clockwise direction, whereby said deck lock impedes rotation of said rotatable deck in either said clockwise or said counterclockwise direction.

12. A vehicular transport attachment as defined in claim 11 wherein
   (a) said peripheral portion is definable by a radial distribution measured from said axis of rotation, said radial distribution comprising a plurality of radial distances, each of said plurality of radial distances being the shortest distance from a unique point on said peripheral portion to said axis of rotation; and,
   (b) said peripheral portion being configured such that said plurality of radial distances vary in magnitude.

13. A vehicular transport attachment as defined in claim 11 wherein said peripheral portion is substantially planar and parallel to said axis of rotation.

* * * * *